United States Patent
Rosiere et al.

(10) Patent No.: US 6,185,805 B1
(45) Date of Patent: Feb. 13, 2001

(54) METHOD OF FORMING A WINDSHIELD WIPER

(75) Inventors: Alexandre Jean Rosiere, Bastogne; Dieter Cecilia Saedelaere, Lacuisine, both of (BE)

(73) Assignee: Cooper Automotive S.A., Aubange (BE)

( * ) Notice: Under 35 U.S.C. 154(b), the term of this patent shall be extended for 0 days.

(21) Appl. No.: 09/101,515

(22) PCT Filed: Dec. 16, 1996

(86) PCT No.: PCT/EP96/05748

§ 371 Date: Oct. 27, 1998

§ 102(e) Date: Oct. 27, 1998

(87) PCT Pub. No.: WO97/25229

PCT Pub. Date: Jul. 17, 1997

(30) Foreign Application Priority Data

Jan. 10, 1996 (EP) .................................................. 96200043

(51) Int. Cl.[7] ................................. B21D 39/00; B60S 1/38
(52) U.S. Cl. ................. 29/428; 15/250.451; 15/250.452; 72/130
(58) Field of Search ....................... 15/250.451, 250.452, 15/250.53, 250.44, 250.454; 29/897.2, 558, 557, 428; 72/129, 130, 203, 379.2

(56) References Cited

U.S. PATENT DOCUMENTS

| | | | |
|---|---|---|---|
| 997,238 | * 7/1911 | Casgrain | ................................. 29/557 |
| 1,923,827 | * 8/1933 | Holt . | |
| 1,959,027 | * 5/1934 | Hemstreet . | |
| 2,957,226 | * 10/1960 | Dibner | ................................... 29/557 |
| 4,782,549 | * 11/1988 | Beneteau et al. | ................ 15/250.452 |
| 5,697,156 | * 12/1997 | Buechele | ........................ 15/250.452 |

FOREIGN PATENT DOCUMENTS

| | | | |
|---|---|---|---|
| 3208749 | * 10/1982 | (DE) . | |
| 7017 | * 6/1979 | (EP) . | |
| 260809 | * 3/1988 | (EP) . | |
| 465095 | * 1/1992 | (EP) . | |
| 2243991 | * 11/1991 | (GB) | ................................ 15/250.453 |
| 2292672 | * 3/1996 | (GB) . | |

* cited by examiner

Primary Examiner—Gary K. Graham
(74) Attorney, Agent, or Firm—Reising, Ethington, Barnes, Kisselle, Learman & McCulloch, P.C.

(57) ABSTRACT

A method of forming a windshield wiper which comprises an oscillating arm and a frame connected thereto receiving a wiping element, wherein the wiping element is reinforced by at least one backing strip located in a longitudinally extending recess provided in the wiping element, wherein the frame has at least one claw which partially surrounds the backing strip and the upper portion of the wiping element, wherein laterally extending means are provided for retaining the backing strip, and wherein the backing strip is flattened at a distance from its end over a portion of its length, in which portion said means are formed by a material removing operation.

7 Claims, 3 Drawing Sheets

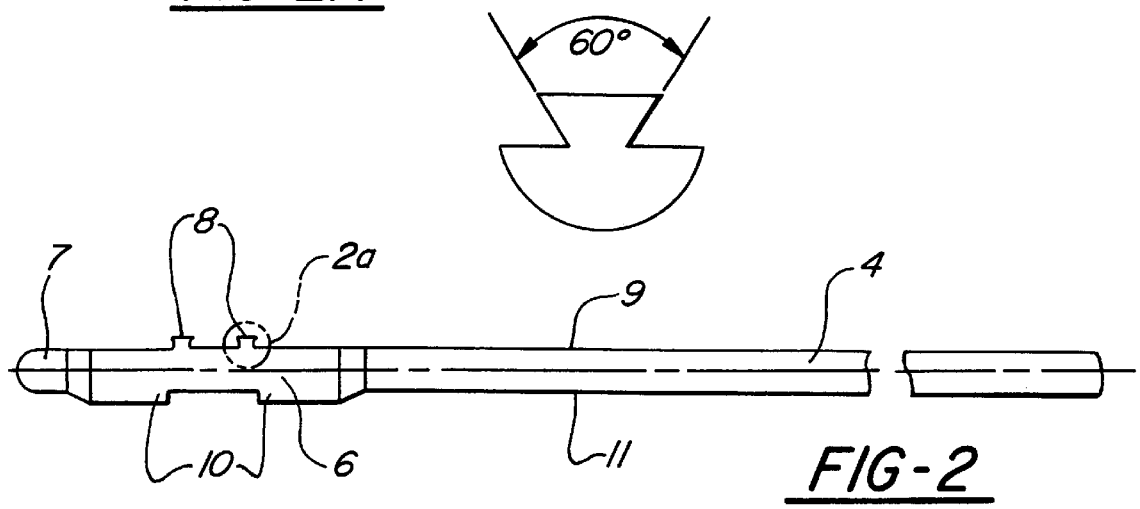
FIG-3A
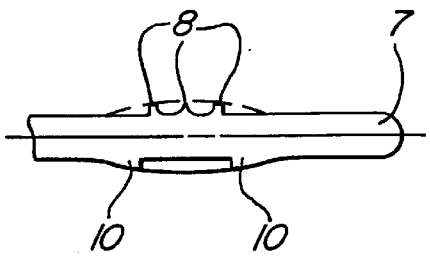
FIG-3B
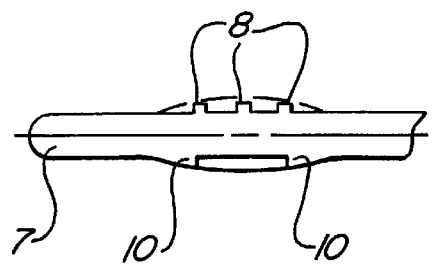
FIG-3C
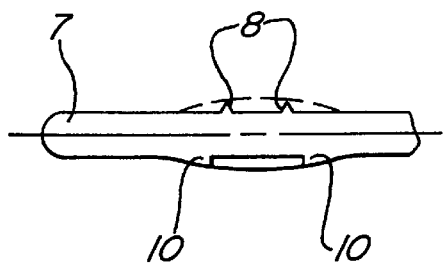
FIG-3D

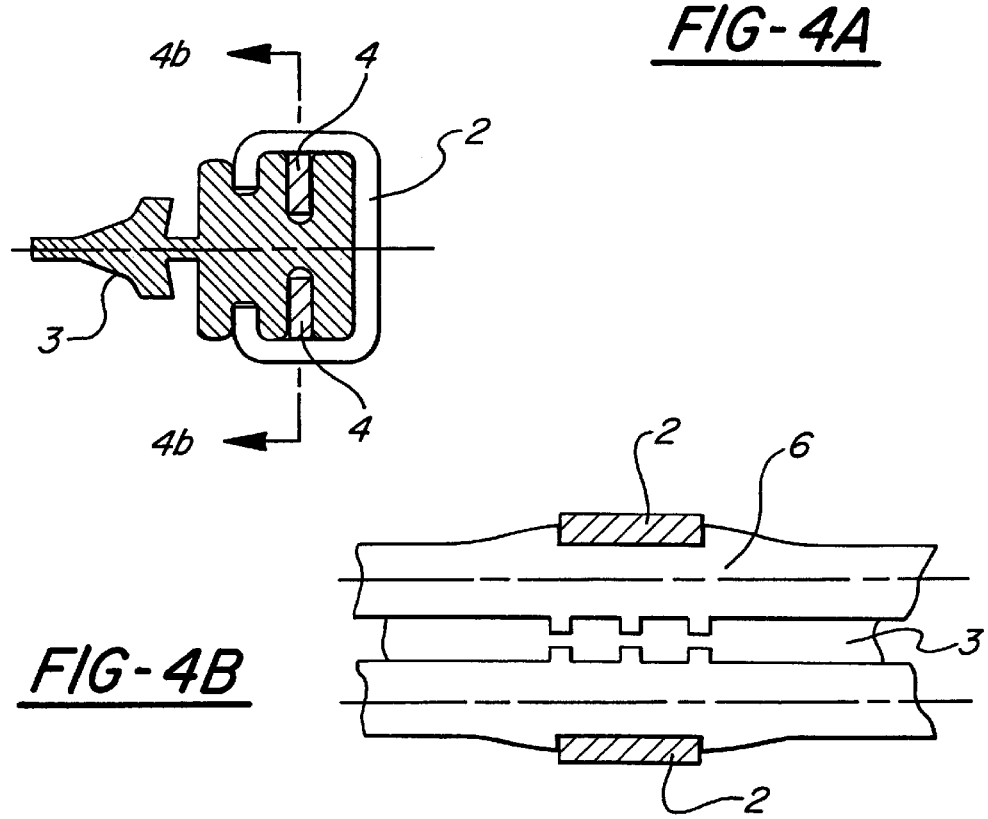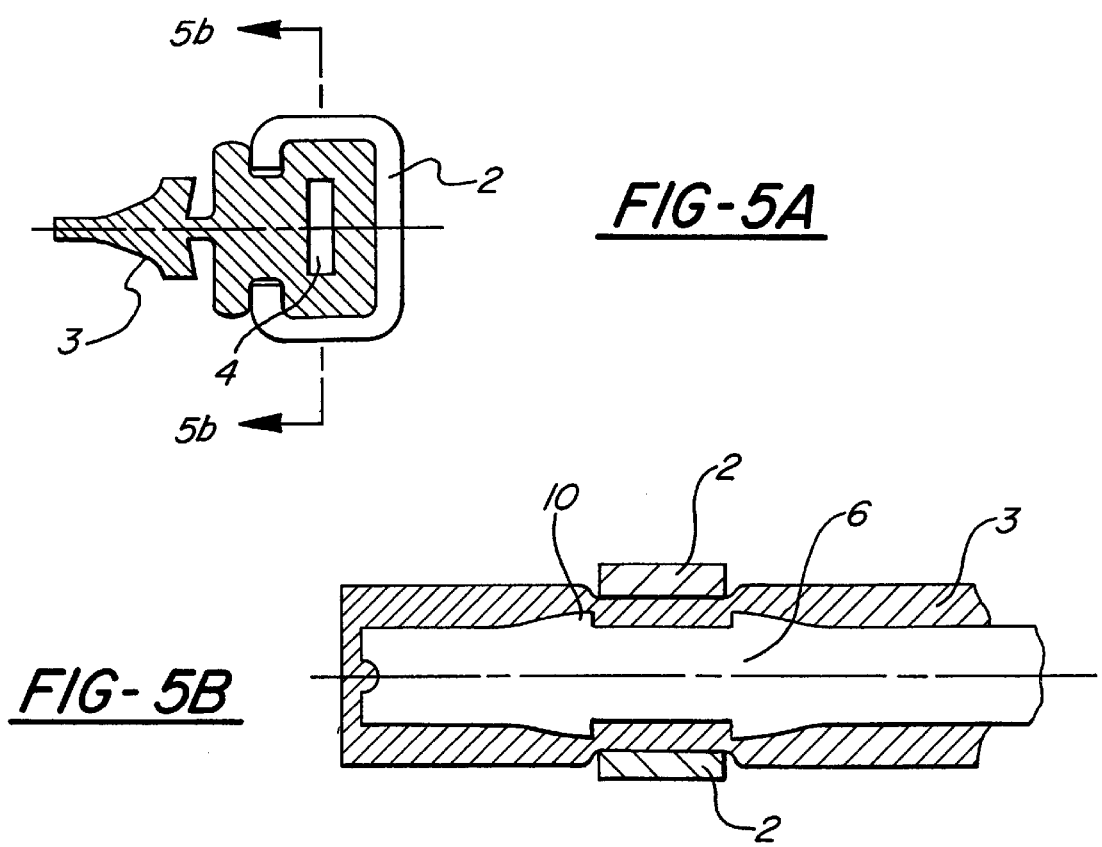

US 6,185,805 B1

METHOD OF FORMING A WINDSHIELD WIPER

TECHNICAL FIELD

The invention relates to a windshield wiper comprising an oscillating arm and a frame connected thereto receiving a wiping element, wherein the wiping element is reinforced by at least one backing strip located in a longitudinally extending recess provided in the wiping element, wherein the frame has at least one claw which partially surrounds the backing strip and the upper portion of the wiping element, and wherein laterally extending means are provided for retaining the backing strip, which is preferably made of metal. The invention also refers to the backing strip as such, and to a process for manufacturing the windshield wiper.

BACKGROUND

Such a windshield wiper is known from the German patent publication No. 32 08 749 (Valeo Systèmes d'Essuyage S. A.). With a windshield wiper of this type the wiping element is formed by a wiping blade made of an elastic material, such as rubber, said wiping blade being reinforced by two metal backing strips respectively inserted in two longitudinally extending recesses in said wiping blade. The frame of the known windshield wiper has several claws retaining the wiping blade and the two backing strips inserted therein in such a way, that a claw located at one end of the wiping blade locally fixates said blade, whereas the other claws allow a movement of the wiping blade in its longitudinal direction. Accordingly said wiping blade is permitted to follow any curvature changes of the windshield on which it lies. The laterally extending means of the known backing strip contain outwardly bent lips on the interior as well as on the exterior longitudinal edge of each backing strip. These lips serve to retain the backing strip in its position.

A disadvantage of a windshield wiper according to the German patent publication referred to above is that, due to the complex construction of the backing strips used therein, it is difficult to manufacture and therefore rather expensive. As the outwardly bent lips on the interior longitudinal edge of each backing strip—due to their sharpness—deeply penetrate into the elastic material of the wiping blade, fractures therein occur during assembly and during any longitudinal movement mentioned earlier of the wiping blade.

It is an object of the invention to obviate these disadvantages, in the sense that at minimum costs—without using complex machinery—simple backing strips are proposed being easier to manufacture and having excellent retaining properties. It is noted that the present invention particularly relates to windshield wipers for motor cars, but is not restricted thereto; it refers also to rail coaches and all other (fast) vehicles. Furthermore, it is to be understood that the present invention also bears on a windshield wiper having an oscillating arm and a frame constructed as one part.

SUMMARY OF THE INVENTION

Thereto, according to the present invention a windshield wiper mentioned in the preamble is characterized in that the backing strip is flattened at a distance from its end over a portion of its length, in which portion said means are formed by a material removing operation. By making use of a material removing operation, preferably punching instead of a bending operation as applied in the above prior art document, a very precise shape of the retaining means can be obtained. The strength and accurate shape of said means are very important, as the rubber wiping blade has a small dimension along the longitudinal recesses wherein the backing strips are inserted. Because the ends (tips) of the backing strip are not flattened, the shape of the retaining means can be accurately controlled.

In an embodiment of a windshield wiper according to the invention flattening the backing strip and removing the material is carried out in one operation. As a result, the accuracy with which the shape of the means for retaining the back strip is manufactured, is increased.

In a further embodiment of a windshield wiper according to the invention the material removing operation is a punching operation. In another preferred embodiment the operation is a cutting/sawing operation.

In a further embodiment of a windshield wiper according to the invention the means comprise at least one tooth extending laterally from the interior longitudinal edge of the backing strip, said tooth retaining the backing strip on the wiping element.

In a further embodiment of a windshield wiper according to the invention the means comprise at least one stop extending laterally from the exterior longitudinal edge of the backing strip, said stop retaining the backing strip on the claw and, as a result, on the wiping element. In another preferred embodiment the means comprise two stops located on opposite sides of the claw, respectively.

The invention furthermore refers to a backing strip suitable for use in a windshield wiper according to the invention.

Finally, the invention relates to a process for manufacturing a windshield wiper according to the invention, comprising the steps of flattening the backing strip at a distance from its end over a portion of its length; and carrying out a material removing operation for forming said means in said portion.

Further objects and effects of the invention will become apparent from the following detailed description taken in conjunction with the drawings, in which

THE DRAWINGS

FIG. 2 is a top view of a backing strip of FIG. 1;

FIG. 3a shows a top view of a flattened portion of a backing strip according to the invention, whereas FIGS. 3b, 3c and 3d refer to various embodiments for the retaining means, seen from above;

FIG. 4a illustrates a cross-sectional view of a wiping blade using a backing strip according to FIG. 3c, FIG. 4b shows a sectional view along line 4b–4b; and FIGS. 5a, 5b correspond to FIGS. 4a, 4b on the understanding that it relates to an embodiment wherein only one backing strip according to the invention is used.

DETAILED DESCRIPTION

Figure 1A:
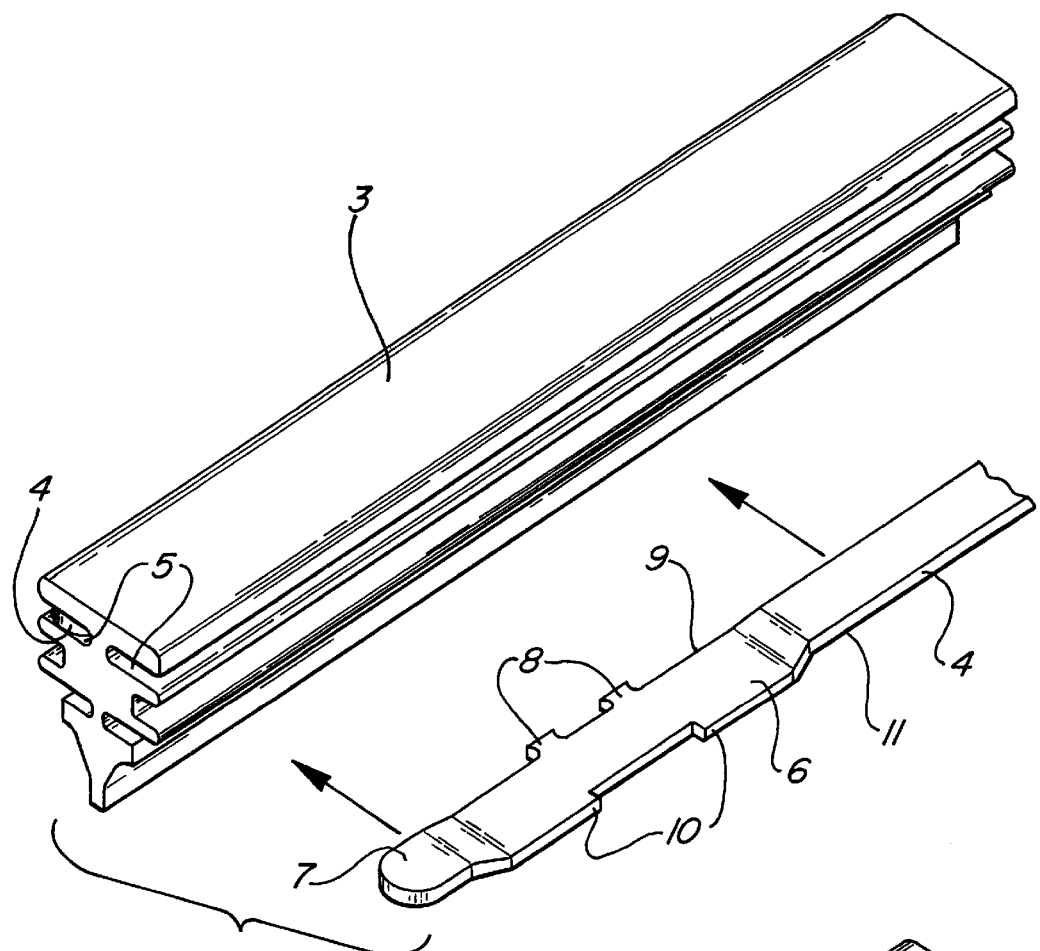
FIGS. 1a and 1b show fragmentary perspective disassembled and assembled view, respectively of a wiping blade with two backing strips according to the invention.
Figure 1B:
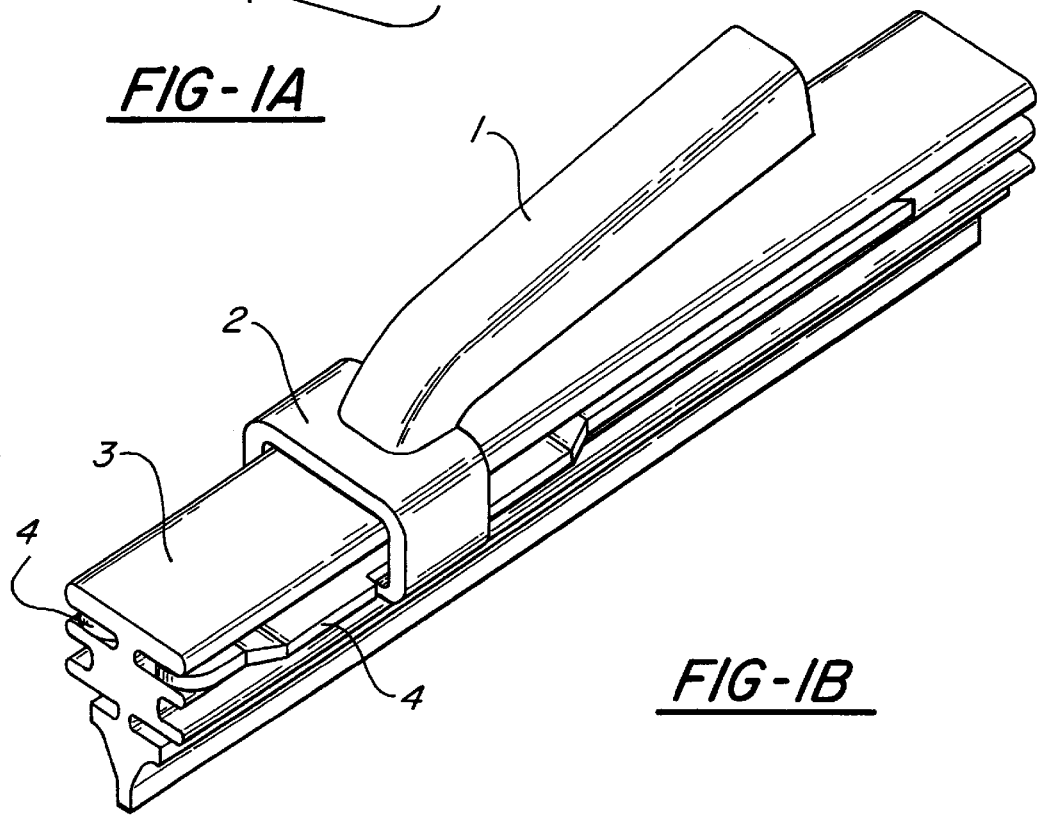

FIGS. 1a and 1b show perspective views of a part of a windshield wiper according to the invention, representing a frame 1 having several claws 2 of which only one is depicted, which claws 2 partially surround the upper portion of a wiping blade 3 and two backing strips 4 inserted in longitudinally extending recesses 5 provided in the wiping blade 3. The wiping blade 3 and the backing strips 4 are preferably made of rubber and metal, respectively. According to the invention both backing strips 4 are flattened over a portion 6 of their length, in such a way that the end (tip) 7 of each backing strip 4 maintains its normal (non-flattened) thickness. Each flattened portion 6 comprises means for retaining the backing strip 4, which means consist of:

- two teeth 8 extending laterally from the interior longitudinal edge 9 of the backing strip 4, said teeth 8 retaining the backing strip 4 on the wiping blade 3; and
- two stops 10 extending laterally from the exterior edge 11 of the backing strip 4, wherein the stops 10 retain the backing strip 4 on the claw 2 and, as a result, on the wiping blade 3.

As can be seen from FIG. 2, each tooth 8 preferably has the form of a swallow tail. In another preferred embodiment the swallow tail has a top angle of 60°.

FIG. 3a illustrates the flattened portion 6 of the backing strip 4 of FIG. 2, wherein the tip 7 of the backing strip 4 remains unflattened. FIGS. 3b, 3c and 3d represent preferred embodiments of the teeth 8 extending laterally from the interior longitudinal edge of the backing strip 4, which teeth 8 in fact function as cramps.

In FIG. 4a a cross-sectional view of the wiping blade 3 of FIG. 1 is shown, whereas FIG. 4b represents a sectional view along line 4b–4b. It is noted that in FIG. 4b backing strips 4 according to FIG. 3c are depicted.

FIGS. 5a and 5b correspond to FIGS. 4a and 4b respectively, on the understanding that the wiping blade 3 is reinforced by only one backing strip 4 located in a longitudinally extending recess centrally provided in the wiping blade 3. This specific backing strip 4 is provided on its interior and exterior edge with two stops 10, respectively to fixate the backing strip 4 on the claw 2 and—as a consequence—on the wiping blade 3.

The present invention makes it possible to provide backing strips being easy to manufacture and having excellent retaining properties vis-à-vis the wiping blade, the latter being due to the very accurate shape and strength of the retaining means provided thereon.

What is claimed is:

1. A method of forming a windshield wiper, comprising:

providing a backing strip blank;

flattening the backing strip blank at a distance from its end over a portion of its length;

carrying out a material removing operation for forming a retaining structure in the flattened portion of the backing strip blank to form the backing strip;

inserting the backing strip in a longitudinally extending recess of a wiping element; and inserting the wiping element in a frame having at least one claw, wherein:

flattening the backing strip blank comprises a flattened portion at a distance from its end over a portion of its length and over an entire width of at least a part of the portion of the length, the flattened portion including the retaining structure serving to retain the backing strip; and the retaining structure cooperates with the wiping element and the claw so as to retain the backing strip on the wiping element.

2. The method of forming a windshield wiper of claim 1, wherein the flattened portion of the backing strip is formed and the material removing operation is carried out in one operation.

3. The method of forming a windshield wiper of claim 1, wherein the material removing operation is a punching operation.

4. The method of forming a windshield wiper of claim 1, wherein the material removing operation is a cutting/sawing operation.

5. The method of forming a windshield wiper of claim 1, wherein the retaining structure comprises at least one tooth extending laterally from an interior longitudinal edge of the backing strip, said tooth retaining the backing strip on the wiping element.

6. The method of forming a windshield wiper of claim 1, wherein the retaining structure comprises at least one stop extending laterally from the exterior longitudinal edge of the backing strip, said stop retaining the backing strip on the claw.

7. The method of forming a windshield wiper of claim 6, wherein the retaining structure comprises two stops located on opposite sides of the claw, respectively.

* * * * *